(12) United States Patent
Och

(10) Patent No.: US 6,338,201 B1
(45) Date of Patent: Jan. 15, 2002

(54) MEASURING INSTRUMENT FOR CHECKING DIMENSIONAL ACCURACY

(75) Inventor: Rudolf Och, Nürnberg (DE)

(73) Assignee: Frenco Verzahnungstechnik, Altdorf (DE)

( * ) Notice: Subject to any disclaimer, the term of this patent is extended or adjusted under 35 U.S.C. 154(b) by 0 days.

(21) Appl. No.: 09/556,518

(22) Filed: Apr. 21, 2000

(30) Foreign Application Priority Data

Apr. 28, 1999 (DE) .......................... 199 19 299

(51) Int. Cl.⁷ .............................. G01B 5/12; G01B 3/26
(52) U.S. Cl. .................. 33/501.11; 33/501.12; 33/542
(58) Field of Search ..................... 33/501.11, 501.7, 33/501.12, 501.14, 542, 543, 544, 555.1

(56) References Cited

U.S. PATENT DOCUMENTS

| | | | | |
|---|---|---|---|---|
| 2,829,440 A | * | 4/1958 | Pedrick | 33/542 |
| 2,849,801 A | * | 9/1958 | Kustusch | 33/542 |
| 4,348,814 A | * | 9/1982 | Possati et al. | 33/542 |
| 4,493,153 A | * | 1/1985 | Esken | 33/542 |
| 5,157,845 A | * | 10/1992 | Possati et al. | 33/542 |
| 5,224,274 A | * | 7/1993 | Blaiklock | 33/542 |
| 6,003,237 A | * | 12/1999 | Sarr et al. | 33/542 |

FOREIGN PATENT DOCUMENTS

| | | |
|---|---|---|
| DE | 31 09 334 C2 | 9/1982 |
| DE | 90 03 357 U1 | 7/1990 |
| DE | 44 12 069 A1 | 10/1995 |

* cited by examiner

*Primary Examiner*—Christopher W. Fulton
(74) *Attorney, Agent, or Firm*—Sughrue Mion, PLLC

(57) ABSTRACT

An instrument for checking dimensional accuracy of a surface or a toothing of a workpiece comprises a measuring head with two diametrically opposite, radially movable checking elements which bear against a surface to be checked and the radial movements of which, caused by irregularities of the surface, are transmitted to a perpendicular drive needle. The movement of the drive needle is registered by a measurement sensor. The axial movement of the measuring head in the workpiece is registered by a travel sensor. The measurement sensor and travel sensor are electronic components, the measurement signals of which can be processed and displayed by electronic data-processing apparatus.

4 Claims, 2 Drawing Sheets

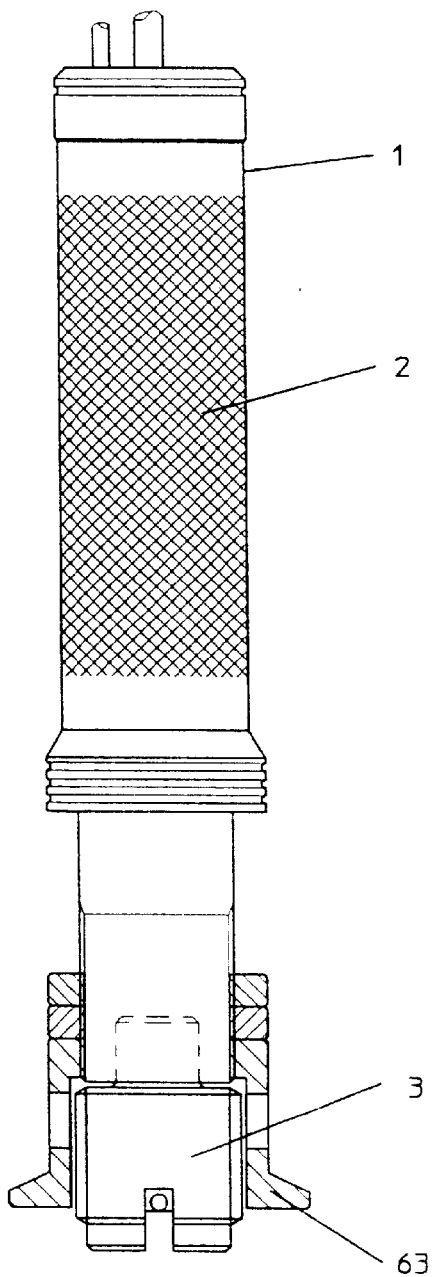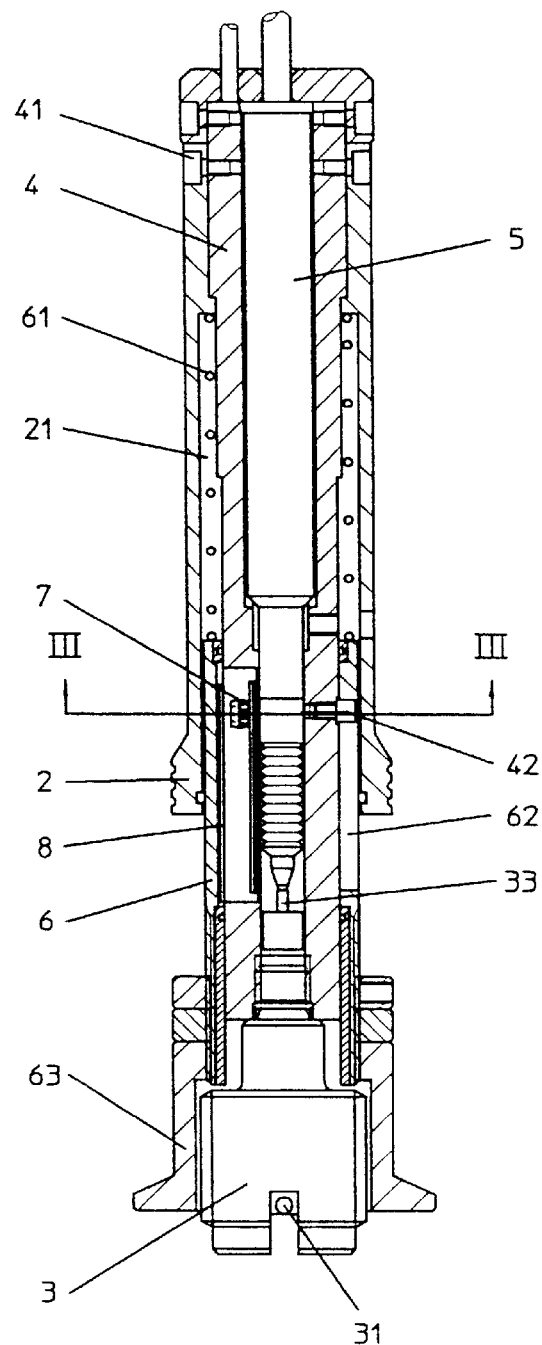
Fig. 1
Fig. 2

MEASURING INSTRUMENT FOR CHECKING DIMENSIONAL ACCURACY

The present invention relates to a measuring instrument for checking dimensional accuracy of a surface or a toothing.

In German patent specification DE 31 09 334 C2 (Frenco) there is disclosed a device consisting of a measuring head in which is mounted a cylindrical support element for two diametrically opposite checking elements bearing against a surface or toothing, which is to be checked, of a workpiece, wherein radial movements of the checking elements caused by irregularities of the surface or the toothing are transmitted to a drive needle extending perpendicularly to the checking elements and displaceable in a central bore of the support element and the displacement of the drive needle is indicated by a measurement sensor. However, this device is subject to the disadvantage that the measuring plane of the checking elements in the workpiece cannot be measured by the device itself.

A measuring instrument for measuring the diameter and axial position of an internal annular groove is described in German specification DE 90 03 357 U1 (Künz), the annular groove being disposed in the cylindrical inner wall of a workpiece. The possible radial dimension and axial dimension of the annular groove can vary only within narrow tolerance ranges. The measuring instrument is therefore not in a position of measuring the accuracy-to-size of the inner diameter of a longer cylindrical space in dependence on axial position.

Moreover, in German specification DE 44 12 069 A1 (Straube) there is disclosed a manually actuable device for ascertaining deviations of a bore from the cylindrical shape, which device is provided for measuring relatively large cylindrical internal diameters of, for example, cylinder liners. In this case, the axial position of a measurement value pick-up is detected at the same time. As the entire measuring device has to be inserted into the bore, this is usable only for measurement of cylindrical spaces with a large internal diameter.

It is therefore the object of the invention to provide an instrument for checking dimensional accuracy of cylindrical surfaces or toothings, the instrument also being usable in the case of a large ratio of length to diameter of the cylindrical surface and being able to measure accuracy-to-size over approximately the entire length.

According to the present invention there is provided a measuring instrument for checking dimensional accuracy of a surface or a toothing of a workpiece, the instrument comprising a handgrip, an inner cylinder member rigidly connected with the handgrip and extending therefrom to have a free end, the handgrip and the inner member defining a substantially cylindrical space therebetween, an outer cylinder member mounted in said space to be displaceable relative to the inner cylinder member when urged against said workpiece, resilient means providing a bias to resist said relative displacement of the inner and outer cylinder members, a measuring head mounted at said free end of the inner cylinder member, a carrier element mounted in the measuring head and defining a central bore having a bore axis, two diametrically opposite checking elements mounted in the carrier element to be radially movable with respect to said bore axis in response to dimensional variations in a workpiece surface engaged by the checking elements, a movement translation member extending substantially perpendicularly to the checking elements and movable in the bore in response to said radial movement of the checking elements, a measurement sensor mounted in the inner cylinder member remote from said free end thereof and responsive to said movement of the translation member to provide a measurement indicative of said movement of the translation member, and a travel sensor responsive to said relative displacement of the inner and outer cylinder members to provide a measurement indicative of said relative displacement.

Preferably, each of the measurement sensor and the travel sensor comprises a respective electronic component. The instrument can include means to prevent relative rotation of the inner and outer cylinder members. Moreover, support means can be arranged on the outer cylinder member to support the instrument on said workpiece.

An embodiment of the present invention will now be more particularly described with reference to the accompanying drawings, in which:

FIG. 1 is a side view, partly in section, of an instrument embodying the invention;

FIG. 2 is a longitudinal sectional view of the instrument;

Figure 3:
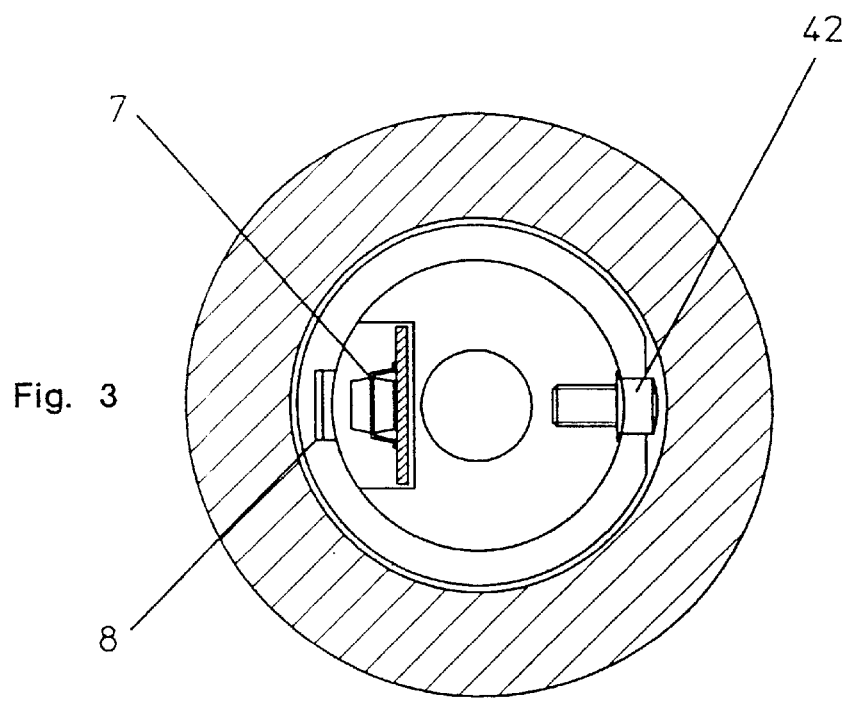
FIG. 3 is a cross-section of the instrument along the line III—III of FIG. 2.
Figure 4:
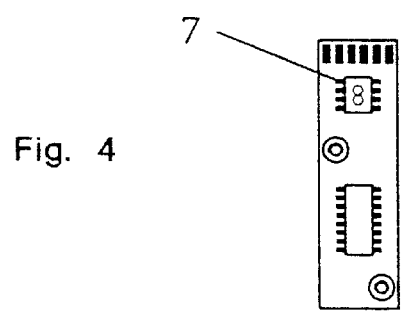
FIG. 4 is a front view of a travel sensor in the instrument.
Figure 5:
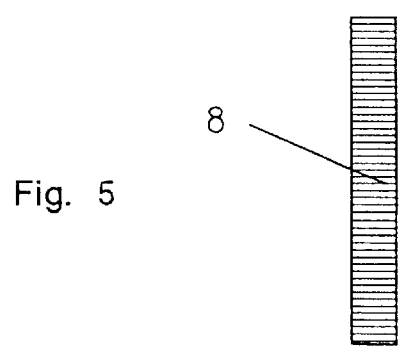
FIG. 5 is a front view of a travel scale in the instrument.

Referring now to the drawings there is shown an instrument 1 for the checking and indication of the accuracy-to-size of cylindrical surfaces and of toothings of workpieces, the instrument comprising a cylindrical handgrip 2 with a coaxial measuring head 3. A coaxial cylindrical support element for two diametrically opposite checking elements 31, which bear against the surface to be checked or against the toothing and which are radially movable with respect to the common axis of the handgrip 2, measuring head 3 and support element, is mounted in the measuring head 3. Only one of the two diametrically opposite checking elements is visible in FIGS. 1 and 2. Radial movements, which are caused by irregularities of the surface or the toothing, of the checking elements 31 are transmitted to a drive needle 33 extending perpendicularly to the checking elements 31 and displaceable in a central bore of the support element.

An inner cylinder 4 is rigidly connected with the handgrip 2, for example by screws 41. The measuring head 3 is mounted at the free end of the inner cylinder 4 and a measurement sensor 5 is mounted at the other end of the inner cylinder 4 in the interior thereof. The displacement of the drive needle 33 is indicated by the measurement sensor 5. Disposed between the handgrip 2 and the inner cylinder 4 is a cylindrical space 21, in which an outer cylinder 6 is mounted to be displaceable against the force of a spring 61. The amount of displacement of the cylinder 6 can be measured by a travel sensor 7. The travel sensor 7, which is mounted at the inner cylinder 4, measures the magnitude of the displacement by reference to a scale 8 mounted on the inner side of the cylinder 6. The measurement sensor 5 and travel sensor 7 are respective electronic components, the measurement values of which can be processed by electronic data-processing apparatus.

Rotation of the outer cylinder 6 relative to the inner cylinder 4 and the handgrip 2 is prevented by a securing device, which consists of a pin 42 at the cylinder 4 and a longitudinal slot 62, into which the pin 42 projects, in the cylinder 6.

Supports 63 for perpendicular positioning of the device 1 on a workpiece to be checked are arranged at the free end of the cylinder 6. After placing the instrument 1 by way of the supports 63 on the workpiece, the measuring head 3 can be moved into, for example, a bore in the workpiece by vertical pressure on the handgrip 2, whereby the dimensional accuracy of the wall surface or surfaces of the bore can be measured in dependence on the depth of inward movement and can be displayed on a screen of electronic data-processing apparatus.

What is claimed is:

1. A measuring instrument for checking dimensional accuracy of a surface or a toothing of a workpiece, the instrument comprising a handgrip, an inner cylinder member rigidly connected with the handgrip and extending therefrom to have a free end, the handgrip and the inner member defining a substantially cylindrical space therebetween, an outer cylinder member mounted in said space to be displaceable relative to the inner cylinder member when urged against said workpiece, resilient means providing a bias to resist said relative displacement of the inner and outer cylinder members, a measuring head mounted at said free end of the inner cylinder member, a carrier element mounted in the measuring head and defining a central bore having a bore axis, two diametrically opposite checking elements mounted in the carrier element to be radially movable with respect to said bore axis in response to dimensional variations in a workpiece surface engaged by the checking elements, a movement translation member extending substantially perpendicularly to the checking elements and movable in the bore in response to said radial movement of the checking elements, a measurement sensor mounted in the inner cylinder member remote from said free end thereof and responsive to said movement of the translation member to provide a measurement indicative of said movement of the translation member, and a travel sensor responsive to said relative displacement of the inner and outer cylinder members to provide a measurement indicative of said relative displacement.

2. An instrument according to claim 1, wherein each of the measurement sensor and the travel sensor comprises a respective electronic component.

3. An instrument according to claim 1, comprising means to prevent relative rotation of the inner and outer cylinder members.

4. An instrument according to claim 1, comprising support means arranged on the outer cylinder member to support the instrument on said workpiece.

* * * * *